Jan. 20, 1925.

W. A. TURBAYNE 1,523,997

AUTOMATIC SYSTEM OF REGULATION

Original Filed March 6, 1916

*INVENTOR.*
*William A. Turbayne*
BY Raymond H. Van Mest
*ATTORNEYS.*

Patented Jan. 20, 1925.

1,523,997

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

AUTOMATIC SYSTEM OF REGULATION.

Original application filed March 6, 1919, Serial No. 83,189. Divided and this application filed June 1, 1921. Serial No. 474,063.

*To all whom it may concern:*

Be it known that I, WILLIAM A. TURBAYNE, a citizen of the United States, residing at Niagara Falls, in the county of Niagara and State of New York, have invented new and useful Improvements in Automatic Systems of Regulation, of which the following is a specification.

The present invention relates to automatic systems of regulation.

This application is a division of my co-pending application Serial No. 83,189, filed March 9, 1916.

An object of the present invention is to provide a system in which the generator used in charging a storage battery and supplying lights in parallel therewith, may be regulated by a novel arrangement of means.

A further object is to provide a novel system of regulation in which are provided means controlled according to the voltage of the system, and means controlled according to the battery charging current, these means co-operating, though magnetically and mechanically independent.

Further objects will be apparent as the description proceeds.

Figure 1:
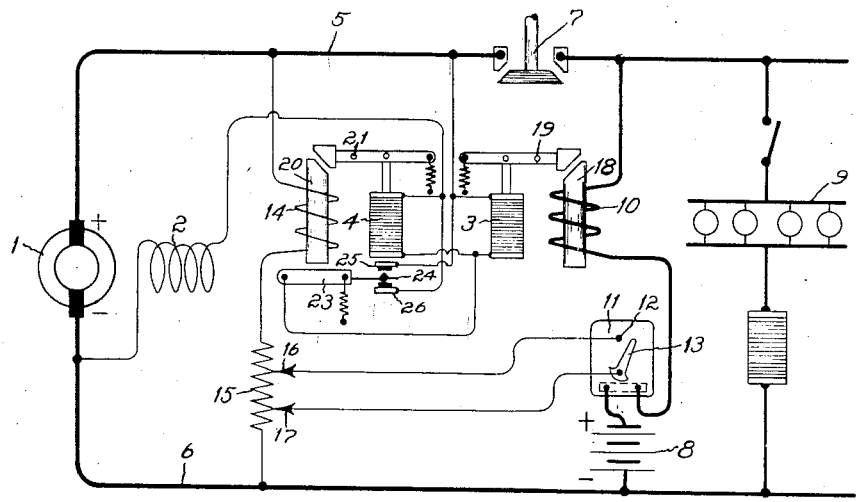
Figure 1 represents diagrammatically one embodiment of the present invention.

Referring first to Fig. 1, a variable speed generator, which may be driven from the axle of the car, is represented by the numeral 1. The excitation of said generator may be furnished by a shunt field winding 2. In circuit with the shunt field winding 2 are two regulating media 3 and 4, represented as carbon piles. The generator 1 may supply mains 5 and 6, the main 5 being provided with an automatic switch 7 of any preferred construction. Across the mains 5 and 6, the storage battery 8 and translation circuit 9 are connected in parallel branches. In series in the battery branch is the coil 10 and the ampere hour meter 11. Said ampere hour meter is connected to measure in ampere hours the input to and output from the storage battery 8. Said meter 11 may be of any preferred type, but should be of the type which automatically changes its standard of registration upon reversal of the direction of current flow therethrough. Said meter may be adjusted to compensate for battery losses, whereby the meter will indicate at all times the available charge in the battery. Said meter is provided with a fixed contact 12 and a movable contact 13, the function of which will be explained hereafter.

Figure 3:
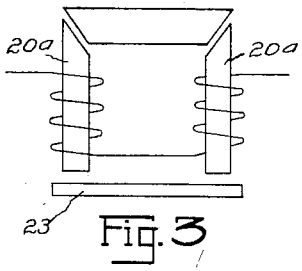
Figure 3 represents a detail.

Connected in shunt across the mains 5 and 6 is a circuit including a coil 14 and a resistance 15. Co-operating with said resistance are two adjustable contacts 16 and 17 which are connected to contacts 12 and 13 respectively of the meter 11. The coil 10 in the battery branch is shown as co-operating with the pile 3 through the medium of a core 18 and a lever 19. The shunt coil 14 is shown as cooperating with the pile 4 through the medium of a core 20 and a lever 21. Core 20 is preferably of the form illustrated in Figure 3 in which the core is provided with two core members 20ª having a movable yoke 23 adapted to bridge the lower end of the core members. The yoke 23 is biased away from the core members by spring means or gravity. Mounted to move with yoke member 23 is a contact 24 which co-operates with fixed contacts 25 and 26. When the yoke 23 is in its biased position, contacts 24 and 26 will engage one another to short-circuit the carbon pile 4, whereas, when yoke 23 has been attracted by the core members, contacts 24 and 25 will engage to short-circuit the carbon pile 3.

A mode of operation of the system illustrated in Fig. 1 is substantially as follows. Starting with the generator 1 at rest and the battery 8 in a partially discharged condition, meter contacts 12 and 13 will be separated so that the resistance 15, in unshunted condition, will be in series with coil 14, so that the pull of the voltage coil 14 will be insufficient to raise the yoke 23, thus permitting yoke 23 to remain in its lower or biased position, short-circuiting carbon pile 4. In this condition, pressure on carbon pile 3 will be a maximum and carbon pile 4 will be short-circuited, so that the generator field may rapidly build up. Excess current through the battery will be prevented by battery branch coil 10, which will operate the carbon pile 3 to maintain constant current to the battery. When the ampere hour meter registers full charge, the meter contacts 12 and 13 will engage to short-circuit that portion of the resistance 15 between the adjustable contacts 16 and 17. This will greatly increase the effect of the coil 14, which will at once pull up yoke 23, opening the short circuit around the pile 4 and closing the short circuit around pile 3. Thereafter coil 14 will so operate carbon pile 4 as to maintain certain predetermined voltage constant. This voltage is preferably the floating voltage of the battery. In this system, therefore, the battery will be charged at constant current, regardless of variations or fluctuations in the load circuit, until the charge is completed. At completion of the charge, the voltage of the generator will be cut down to the floating voltage of the battery, so that the generator may thereafter supply the translation circuit directly, permitting the battery to float across the line.

Figure 2:
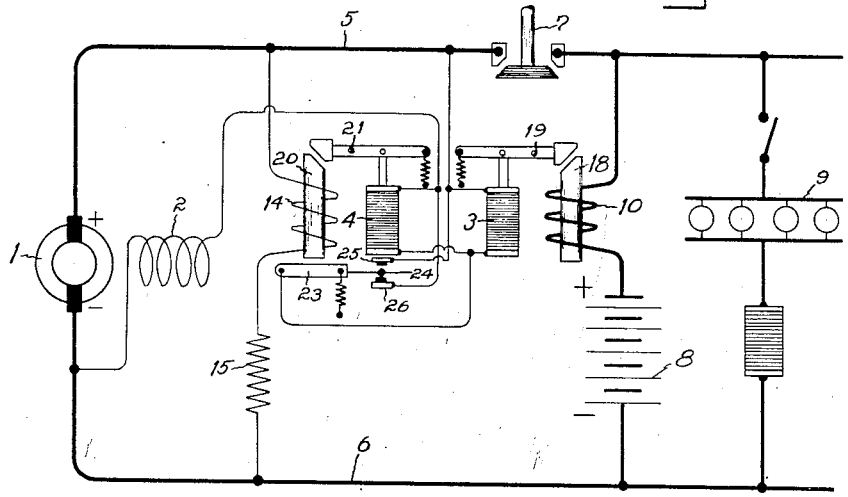
Fig. 2 represents a modification of the system illustrated in Fig. 1.

Fig. 2 illustrates a modification which may be used in systems which do not warrant the expense involved in an ampere hour meter. This system involves the two mechanically and magnetically distinct regulators having the carbon piles 3 and 4, as in Figure 1. The magnet involving the core members 20ª and yoke 23 is designed to have sufficient reluctance so that when the yoke 23 is in its unattracted or biased position, the lever 21 will not be responsive to changes in voltage in the coil 14. When, however, the maximum voltage which it is desired to have impressed on the battery 8 is reached, the yoke 23 will be attracted, reducing the reluctance of the magnet. Thereafter the coil 14 will control the carbon pile 4 in response to the voltage variations across the mains 5 and 6. Due to the reduced air-gap between the core members 20ª and yoke 23, the yoke 23 will remain in its attracted position at a lower voltage than was required to draw it up. For this reason, the battery may be charged with a constant current until the maximum desired voltage is obtained across the mains, at which time the yoke 23 will be attracted. Thereafter the voltage across the mains may be maintained at substantially the floating voltage of the battery.

The system illustrated in Figure 2 is also provided with the means for short circuiting pile 3 and the means for short circuiting pile 4, as explained in connection with Figure 1.

Many modifications of the present invention will occur to those skilled in the art. This application is intended to cover all such modifications that fall within the scope of the invention as defined by the appended claims.

What I claim as new and desire to secure by Letters Patent of the United States, is—

1. In combination, a variable speed generator, a battery, a regulating medium for maintaining constant battery current, a regulating medium independent of said first mentioned medium for maintaining constant voltage across said generator, and short circuiting means associated with said media and under the control of the operating means for one of said regulating media, whereby one of said media is short circuited when the other is operative.

2. In combination, a variable speed generator, a battery, regulating means therefor including a regulating medium whereby said generator is regulated to deliver a constant current to said battery, other regulating means magnetically and mechanically independent of said first named regulating means also including a regulating medium whereby constant voltage may be maintained across said generator, said second mentioned regulating means being provided with means to vary the sensitiveness thereof, and short-circuiting means for said media controlled by said varying means.

3. In combination, a variable speed generator, a battery to be charged, current regulating means including a regulating medium, voltage regulating means magnetically and mechanically independent of said current regulating means and also including a regulating medium, and short circuiting means for each of said media, controlled by said voltage regulating means.

4. In combination, a variable speed generator, a storage battery to be charged thereby, a plurality of regulating media for regulating said generator, battery current controlled operating means for one of said media, generator voltage controlled operating means for another of said media, short-circuiting means, operable by one of said operating means, adapted selectively to short-circuit one or the other of said media whereby said generator may be regulated solely in response to battery current or generator voltage, and means responsive to a function of the battery charge for determining which of said media shall regulate the generator.

5. In combination, a variable speed generator, a storage battery to be charged thereby, a regulator for said generator controlled by variations in current to the battery, a second regulator for said generator controlled by voltage of the generator, means under the control of said voltage operating means for rendering one of said regulators operative and the other inoperative, and an ampere hour meter in the battery circuit controlling the operation of said voltage regulating means to determine which of said regulators shall be operative.

6. In combination, a variable speed generator, a storage battery to be charged thereby, a regulator for said generator controlled by variations in current to the battery, a second regulator for said generator controlled by voltage of the generator, and means under the control of said voltage operating means for rendering one of said regulators operative and the other inoperative, said means being responsive to a function of the battery charge to determine which of said regulators shall be operative.

In witness whereof, I have hereunto subscribed my name.

WILLIAM A. TURBAYNE.